United States Patent
Garvey

(10) Patent No.: US 6,612,425 B1
(45) Date of Patent: Sep. 2, 2003

(54) MULTIPLE DRIVE CONVEYOR SYSTEM

(75) Inventor: Mark C. Garvey, Cedarbrook, NJ (US)

(73) Assignee: Garvey Corporation, Blue Anchor, NJ (US)

( * ) Notice: Subject to any disclaimer, the term of this patent is extended or adjusted under 35 U.S.C. 154(b) by 0 days.

(21) Appl. No.: 10/172,075

(22) Filed: Jun. 18, 2002

(51) Int. Cl.$^7$ ............................................. B65G 15/60
(52) U.S. Cl. ..................... 198/839; 198/347.1; 198/570
(58) Field of Search ........................... 198/347.1, 347.2, 198/347.4, 839, 570

(56) References Cited

U.S. PATENT DOCUMENTS

| | | | | | |
|---|---|---|---|---|---|
| 983,669 | A | * | 2/1911 | Beier | 198/703 |
| 2,798,590 | A | * | 7/1957 | Raskin | 198/839 |
| 3,016,127 | A | * | 1/1962 | Cooper | 198/839 |
| 3,189,166 | A | * | 6/1965 | Ziller | 198/835 |
| 3,253,698 | A | * | 5/1966 | Murphy | 198/637 |
| 4,633,996 | A | * | 1/1987 | Waterhouse | 198/370.1 |
| 5,083,657 | A | * | 1/1992 | Kelsey | 198/811 |
| 5,743,379 | A | * | 4/1998 | Warnecke | 198/839 |
| 6,168,005 | B1 | * | 1/2001 | Petrovic | 198/347.4 |
| 6,260,688 | B1 | * | 7/2001 | Steeber et al. | 198/347.4 |

* cited by examiner

Primary Examiner—Christopher P. Ellis
Assistant Examiner—Richard Ridley
(74) Attorney, Agent, or Firm—Stuart M. Goldstein

(57) ABSTRACT

A conveyor system which has a continuous path conveyor is to be used for transporting and accumulating excessive loads. The conveyor may be formed of a continuous loop of chain elements. The conveyor path consists of two or more product carrying sections and corresponding offset return path sections. A product carrying section of the conveyor wraps around power driven sprockets where it is fed into and becomes a return path section. From there the path is guided over and aligned with free turning tail sprockets, where it is returned as a product carrying section. This section is then fed onto second drive sprockets, powered by another power means, where it again becomes a return path section, guided over tail sprockets and returned as a product carrying section. In this manner, the load of the conveyor chain is relieved at each drive sprocket assembly, thereby increasing the available working distance of the system.

21 Claims, 1 Drawing Sheet

MULTIPLE DRIVE CONVEYOR SYSTEM

BACKGROUND OF THE INVENTION

Conveyor systems are routinely used to handle and transport products both within confined physical spaces and between upstream and downstream destinations located in remote sections of a facility. Such systems which move products, especially heavy products, over long distances, are subject to excessive load forces during the transport process. In addition, product accumulation systems, which are routinely used in conjunction with conveyors for the storage and accumulation of product, employ conveyors and conveyor systems which, given the amount of product which is carried and may be accumulated, are also subject to excessive weight from the loads being transported.

In the normal handling process, systems employing long product conveying surfaces and product accumulators, experience substantial loads even during normal operations. When the products being handled are heavy to begin with, additional excessive forces are experienced by the conveyor surface. It is of critical importance to assure that the working strength of the conveyor and its conveyor chain or similar components are not exceeded during operation of the systems.

Prior solutions for handling excessive loads and accumulating product routinely employ very long conveyor pathways with multiple drives, spaced at designated locations, to distribute the load and ensure continued movement of the conveyor system without exceeding the working strength of the conveyor belt components. Other prior systems contemplate the use of multiple conveyors with multiple drives, forming lengthy pathways for movement and accumulation of product.

Multi-drive systems routinely use conveyors formed of chain circuit components. The chain on the conveyor comprises the carrying surface on which the product being transported moves from point of origin to point of destination. However, there are physical limits to the chain's ability to move loads substantial distances and to accumulate heavy loads. If the load on a given chain exceeds the design limit of the chain, that chain and the conveyor will fail prematurely. As a result, action must be taken to reduce the amount of load that the chain, in its given application, must withstand. As an example, if a conveyor needs to move a product 100 feet and the acceptable load for a given chain conveyor dictates that the maximum length can only be 70 feet, then the conveyor must be split and two drives installed, basically changing the system from a one conveyor to a two conveyor system, with each conveyor being able to convey its particular load within the design limits of the conveyor chain component.

Such a conveyor system normally consists of a frame which supports the conveyor chain, such that its upper or product carrying surface moves along a designated path. The frame also provides a path for the chain to return, by traveling underneath the frame and up to the carrying surface once again.

At the tail end or infeed end of the conveyor, a shaft and bearings, which support sprockets, acts as a transition section from the return path to the carrying surface of the conveyor. This is a free turning sprocket, shaft, and bearing assembly, to which no power is applied. The movement of the chain from the return path to the product carry surface is what causes the sprockets to turn.

At the drive or discharge end of the conveyor, there is a drive sprocket assembly, with bearing support shaft, that is mechanically connected to the power transmission source. This source imparts power to the drive assembly, turning the sprockets, thereby pulling the chain across the length of the frame of the conveyor. As the chain leaves the drive sprocket assembly, there is no load on any particular link of chain which is disengaged from the sprocket. The first point of load development occurs when the chain feeds back into the return path and starts to slide through the path. The amount of load that is developed is a function of the weight of the chain, the length of the chain, the friction coefficient between the chain and the return path material, and the degrees of curve that the chain must pull through on the return path.

When the chain completes its path through the return track and wraps around the tail end sprocket, it begins its path as the product or load carrying surface. The amount of load on the carry side is a function of the chain length, the chain weight, the coefficient of friction between the chain and the carry track, the product weight, the number of products on the conveyor, the coefficient of friction between the product and the chain, the amount of slippage that will occur between the product and the chain in the event that products back up on the conveyor, and the number of curves that the carry surface must go through to get to the downstream destination.

The load is calculated in a sequential build-up, starting at the drive, through the return, and then through the carry surface, until it engages the first tooth of the sprocket. The entire load of the conveyor has to be pulled by the tooth of the sprocket that is engaging the first link of the chain to become engaged by the drive sprocket. This is what determines the working strength of the chain. The materials of construction of the chain and the sprocket is what determines the working strength of the combination.

As previously described, in order to ensure that the working strength of the conveyor systems are not exceeded by the loads being conveyed, multiple power drives are routinely used to distribute the load in a continuous path conveyor or conveyors are split and driven by multiple power means to ensure that the design limitations are not exceeded. However, such prior systems disadvantageously require a substantial amount of physical space and so are not easily and efficiently manufactured and assembled. Such systems also require extra components, including conveyor chain, frame, and connecting components, especially for the substantial return paths which are required. Maintenance, cleaning, and sanitization is also difficult with such large systems.

SUMMARY OF THE INVENTION

It is thus the object the present invention to overcome the limitations and disadvantages of prior product conveying and accumulation systems.

It is an object of the present invention to provide a conveying system which uses a carousel conveyor path arrangement to efficiently and effectively transport and accumulate excessive loads.

It is a further object of the present invention to provide a product conveyor system which employs a single continuous loop path that runs through multiple power drives, in order to distribute product load.

It is another object of the present invention to provide a product conveyor system which efficiently and effectively carries substantial loads without exceeding the working strength of conveyor components.

It is still another object of the present invention to provide a product conveyor system which eliminates substantial components of the return sections of the conveyor system and generally reduces the size of the overall system.

It is another object of the present invention to provide a product conveyor system which generally uses less components and thus is less costly to manufacture and assemble.

It is a further object of the present invention to provide a product conveyor system which can be constructed in a relatively small physical space.

It is still a further object of the present invention to provide a product conveyor system which allows for ease of maintenance, cleaning, and sanitization.

It is another object of the present invention to provide a product conveyor system which operates relatively quietly while transporting product.

It is a further object of the present invention to provide a product conveyor system which efficiently and effectively places multiple power drives, thereby overcoming overload problems associated with the conveying and accumulation of products of excessive weight.

It is still another object of the present invention to provide a product conveyor system which comprises multiple power drives which are automatically synchronize and balance each other during product transport, even during unbalanced load conditions.

These and other objects of the invention are accomplished by the present invention which consists of a conveyor system comprising of a continuous path conveyor. The conveyor may be formed of a continuous loop of chain elements. The conveyor path consists of two or more product carrying sections and corresponding offset return path sections. A product carrying section of the conveyor wraps around power driven sprockets where it is fed into and becomes a return path section. From there the path is guided over and aligned with free turning tail sprockets, where it is returned as a product carrying section. This section is then fed onto second drive sprockets, powered by another power means, where it again becomes a return path section, guided over tail sprockets and returned as a product carrying section. In this manner, the load of the conveyor chain is relieved at each drive sprocket assembly, thereby increasing the available working distance of the system.

Novel features which are considered as characteristic of the invention are set forth in particular in the appended claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
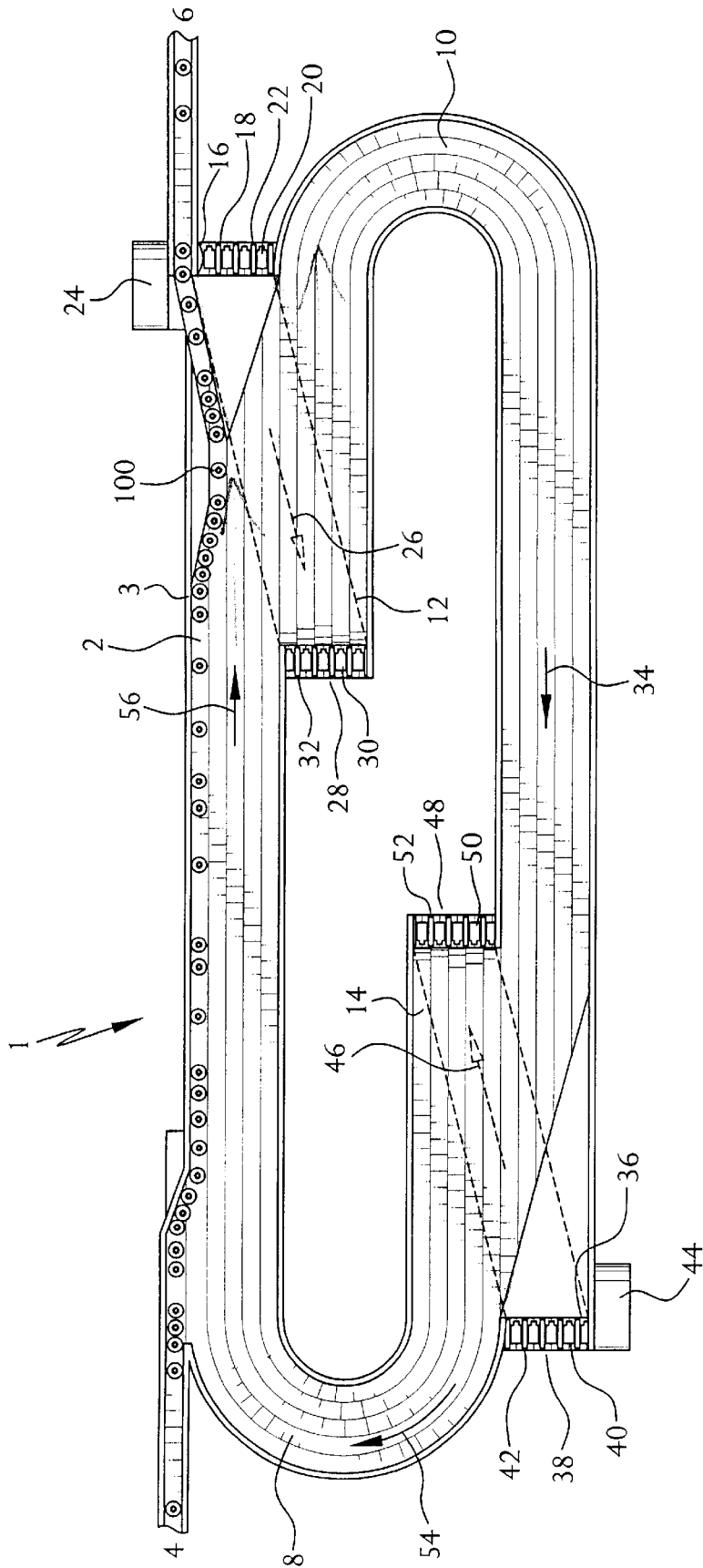
FIG. 1 is a top view of the produce conveyor system of the present invention, showing the directional movement of the components in the system.

Conveyor system 1 comprises single loop, continuous path conveyor 2, which may be mounted above the ground, for instance on a raised frame 3, common to the industry. Conveyor 2 is configured to move and accumulate product, such as bottles 100, from an upstream location designated at 4, to a downstream location, designated at 6. Conveyor 2 comprises product carrying sections 8 and 10, and offset return path sections 12 and 14. It is anticipated that these sections of conveyor 2 may be constructed of interlocking chain segments, which are well known in the industry. Sections 8, 10, 12 and 14 form the continuous conveyor 2. All these conveyor sections are located in the same transverse plane.

As the chain segments making up product carrying section 8 arrive at the location designated at 16, they interconnect with drive sprocket assembly 18, comprising bearing supported shaft 20, which supports sprockets 22. Shaft 20 is mechanically connected to a power unit, such as AC drive motor 24, which imparts motive power to drive sprocket assembly 18 through the shaft. This in turn rotates sprockets 22, pulling section 8 of conveyor 2 around and underneath frame 3 of conveyor system 1, in the direction shown by arrow 26. Return path section 12 of conveyor 2 then travels via an offset path, which may be of "s" shape return configuration, in the direction shown by arrow 26, until it encounters tail sprocket assembly 28. Tail sprocket assembly 28 comprises bearing supported shaft 30 which supports sprockets 32. The chain of conveyor 2, passing over sprockets 32, serves as a transition from return path section 12 to product carrying section 10. Tail sprocket assembly 28 is a free turning sprocket, shaft, and bearing assembly which has no power supplied to it. The movement of the chain from return path section 12 to product carry section 10 is what causes sprocket assembly 28 to rotate.

The chain segments of product carrying section 10 of conveyor 2 continue to move in the direction designated by arrow 34 until they arrive at the location designated at 36. There, they interconnect with drive sprocket assembly 38, comprising bearing support shaft 40, which supports sprockets 42. Shaft 40 is mechanically connected to a power unit, such as AC drive motor 44, which imparts motive power to drive sprocket assembly 38 through the shaft. This in turn rotates sprockets 42, pulling section 10 of conveyor 2 around and underneath frame 3 of conveyor system 1, in the direction shown by arrow 46. Return path section 14 of conveyor 2 then travels via an offset path, which, like path section 12, may be of "s" shape return configuration, in the direction shown by arrow 46, until it encounters tail sprocket assembly 48. Tail sprocket assembly 48 comprises bearing support shaft 50, which supports sprockets 52. The chain of conveyor 2, passing over sprockets 52, serves as a transition from return path section 14 to product carrying section 8. Tail sprocket assembly 48 is a free turning sprocket, shaft, and bearing assembly which, like tail sprocket assembly 28, has no power supplied to it. The movement of the chain from return path section 14 to product carry section 8 is what causes tail sprocket assembly 48 to rotate.

Once passed tail sprocket assembly 48, product carrying section 8 proceeds in the direction designated by arrows 54 and 56 to designation 16, where the process begins again.

Testing has demonstrated that if AC drive motors 24 and 44 of the drive transmissions are attached to the same power source, at the same frequency (cycles per second) and voltage, the two drive motors automatically synchronized and balance each other. For instance, slippage in one motor will automatically be compensated for by an increase in speed of the other. This occurs even if there is an unbalanced load condition on the conveyor system.

By this configuration, the excessive loads of the chain of conveyor 2 of conveyor system 1 are relieved at each drive sprocket assembly. As a result, the available working distance of the system is increased, while return path section components are substantially reduced, as the size of the overall system can be reduced. The result is a single, continuous path conveyor system which can efficiently, effectively and economically transport and accumulate excessive loads without exceeding the working strength of conveyor components.

The operation of the conveyor system also results in quieter transport of products, even glass bottle products. The continuous smooth operation provided by the multiple drives transports products, while permitting less contact between the products during product movement.

Although conveyor system 1 as shown is described with dual power means, it is contemplated that additional power means may be employed and arranged with the conveyor of the system to further increase the transporting and accumulating capacity and capability of the system.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed is:

1. A conveyor system comprising:
   (a) a single continuous path conveyor, said conveyor comprising a plurality of separate product carrying sections and a plurality of separate return path sections which are located and move below the product carrying sections of the conveyor, each return path section comprising one single run of conveyor moving in a single direction, each single run directly interconnecting adjacent product carrying sections; and
   (b) multiple power means for moving the conveyor and for moving product on the product carrying sections, each of the separate return path sections having one of the multiple power means as its own power source for providing a motive force to the conveyor substantially at each of the separate return path sections.

2. The conveyor system as in claim 1 in which the product carrying sections are all located in a single transverse plane.

3. The conveyor system as in claim 1 in which the multiple power means comprises two power transmitting means, one power means providing a motive force to one of the return path sections and the other power transmitting means provides a motive force to a second return path section.

4. The conveyor system as in claim 1 wherein the product carrying section moves towards and in the direction of one of the multiple power means.

5. The conveyor system as in claim 1 wherein the product carrying sections of the conveyor become return path sections of the conveyor at one of the multiple power means.

6. The conveyor system as in claim 1 wherein a product carrying section of the conveyor becomes a return path section of the conveyor substantially at one of the multiple power means and a second product carrying section of the conveyor becomes a second return path section of the conveyor substantially at a second of the multiple power means.

7. The conveyor system as in claim 1 wherein the return path section is configured to move away from one of the multiple power means.

8. The conveyor system as in claim 1 wherein the multiple power means comprises drive motors and power transmission systems.

9. The conveyor system as in claim 1 wherein the multiple power means are automatically synchronized with each other by use of the same power source.

10. The conveyor system as in claim 1 in which the multiple power means comprises two drive means, one drive means moving one return path section and the other drive means moving a second return path section.

11. A conveyor system comprising:
    (a) a conveyor comprising two product carrying sections and two separate return path sections which are located and are moved below the product carrying sections, each return path section comprising one single run of conveyor moving in a single direction, each single run directly interconnecting adjacent product carrying sections, two product carrying sections and the two return path sections forming a single, continuous path;
    (b) a first power means located substantially at one of the return path sections for moving the first return path section and the first product carrying section; and
    (c) a second power means located substantially at the second return path section for moving the second return path section and the second product carrying section.

12. The conveyor system as in claim 11 wherein the two product carrying sections are located in the same plane.

13. The conveyor system as in claim 11 wherein the direction of movement of the first product carrying section is changed and said section becomes the first return path section, at the first power means.

14. The conveyor system as in claim 13 wherein the direction of movement of the second product carrying surface section is changed and said section becomes the second return section at the second power means.

15. The conveyor system as in claim 11 wherein the first and second power means are automatically synchronized by use of the same power source.

16. A conveyor system comprising:
    (a) a conveyor comprising two product carrying sections located in the same transverse plane and two separate return path sections, each return path section comprising one single run of conveyor moving in a single direction, each single run directly interconnecting adjacent product carrying sections, the two product carrying sections and the two return path sections forming a single, continuous path;
    (b) a first power means located substantially at one of the return path sections for moving the first return path section and the first product carrying section; and
    (c) a second power means located substantially at the second return path section for moving the second return path section and the second product carrying section.

17. The conveyor system as in claim 16 wherein the direction of movement of the first product carrying section is changed and said section becomes the first return path section, at the first power means.

18. The conveyor system as in claim 17 wherein the direction of movement of the second product carrying surface section is changed and said section becomes the second return section at the second power means.

19. The conveyor system as in claim 16 wherein the first and second power means are automatically synchronized by use of the same power source.

20. A conveyor system comprising:
    (a) a conveyor comprising two product carrying sections and two separate return path sections, each return path section comprises one single run of conveyor moving in a single direction, each single run directly interconnecting adjacent product carrying sections, the two product carrying sections and the two return path sections forming a single, continuous path;

(b) a first power means located substantially at one of the return path sections for moving the first return path section and the first product carrying section; and (c) a second power means located substantially at the second return path section for moving the second return path section and the second product carrying section, wherein the direction of movement of the first product carrying section is changed and said section becomes the first return path section at the first power means and the direction of movement of the second product carrying surface section is changed and said section becomes the second return section at the second power means.

21. The conveyor system as in claim 20 in which the product carrying sections are all located in the same transverse plane.

\* \* \* \* \*